J. B. RAMOS.
FARMING IMPLEMENT.
APPLICATION FILED SEPT. 20, 1918.
1,321,474.
Patented Nov. 11, 1919.
4 SHEETS—SHEET 3.
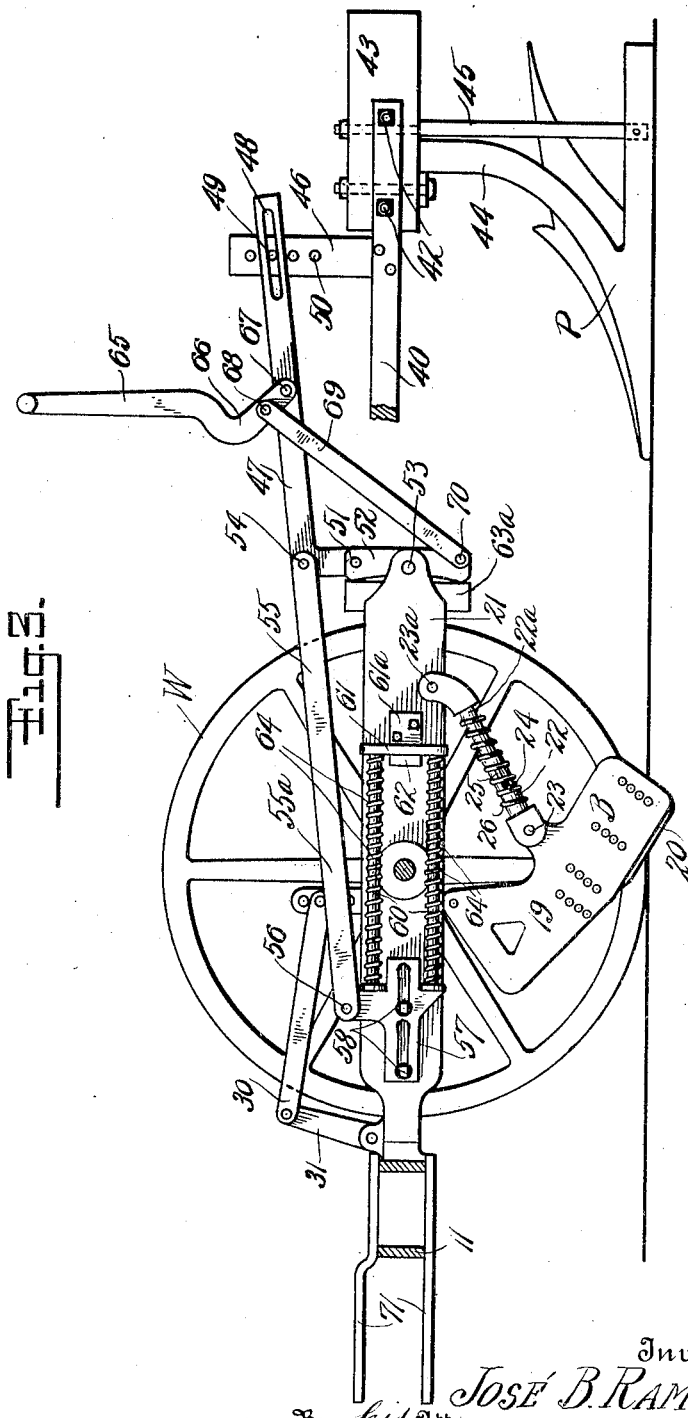
Inventor
JOSÉ B. RAMOS
By his Attorney
Wm Wallace White

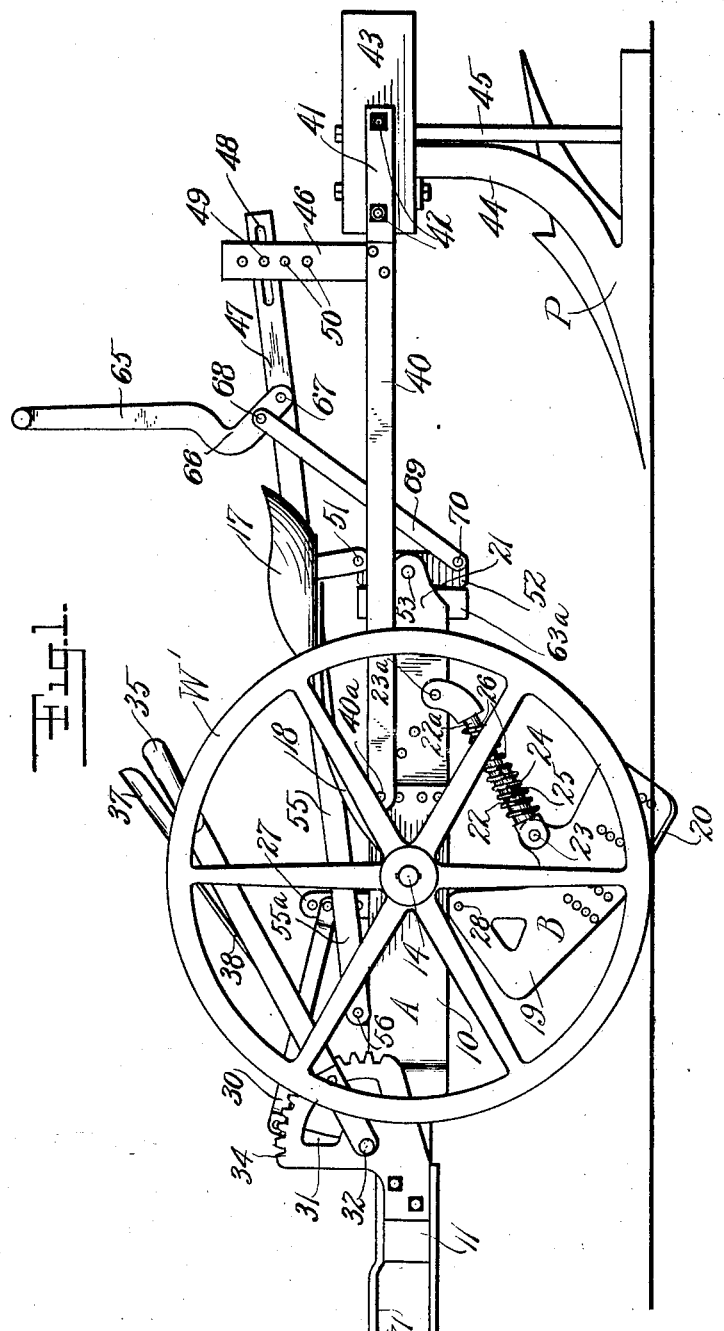

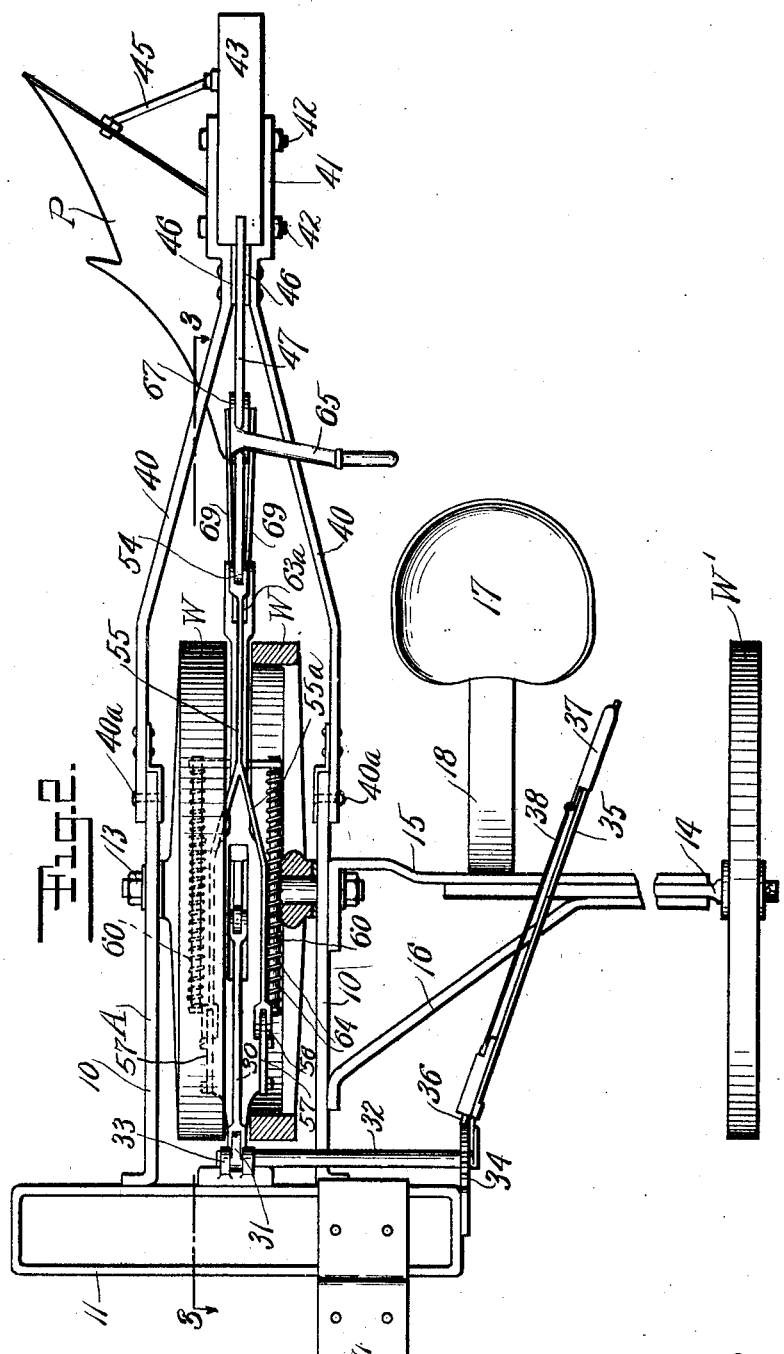

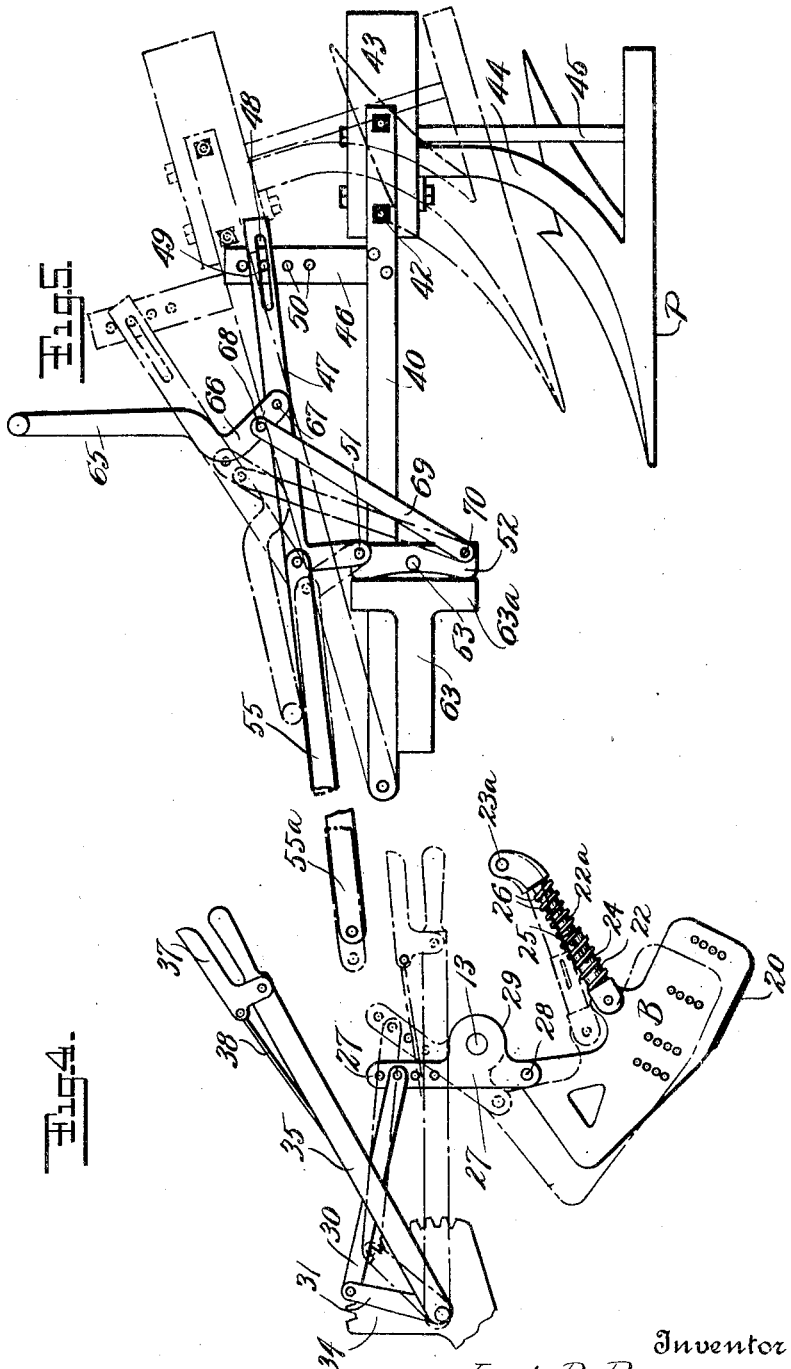

UNITED STATES PATENT OFFICE.

JOSE B. RAMOS, OF MARIANAO, CUBA.

FARMING IMPLEMENT.

1,321,474. Specification of Letters Patent. Patented Nov. 11, 1919.

Application filed September 20, 1918. Serial No. 254,896.

*To all whom it may concern:*

Be it known that I, JOSE B. RAMOS, a citizen of the Republic of Cuba, residing at Marianao, Cuba, have invented new and useful Improvements in Farming Implements, of which the following is a specification.

My invention relates to farming implements, and has for its object the provision of an apparatus for cutting straw, such as that formed by the dried leaves of sugar-cane plants, into the suitable lengths to permit embedding of the straw in the soil as it is plowed, so that the straw can be used as a fertilizer for enriching the soil.

Another object of my invention is the provision of an apparatus of the above described character, having adjustable means for cutting the straw, such cutting means being adapted to penetrate the soil at an acute angle and to thus coact therewith to shear the straw during its travel.

Another object of the present invention is the provision of means for resiliently supporting the cutting means, and means for resiliently supporting the plow whereby the cutting means and plow will yield to any obstruction which they may engage during the operation of the apparatus.

I will describe one form of apparatus embodying my invention and will then point out the novel features thereof in claims.

In the accompanying drawings,

Figure 1 is a view showing, in side elevation, one form of apparatus embodying my invention;

Fig. 2 is a view showing, in top plan, the apparatus shown in Fig. 1, and having a portion thereof shown in horizontal section;

Fig. 3 is a sectional view taken on the line 3—3 of Fig. 2, and looking in the direction of the arrows;

Fig. 4 is a detail view of the cutting means and the mechanism for elevating the same, and each embodying my invention; and Fig. 5 is a detail view showing in side elevation the mechanism for elevating the plow, and embodying my invention.

Similar reference characters refer to similar parts in each of the several views.

Referring to the drawings in detail, and particularly to Figs. 1, 2 and 3, A designates generally a frame or chassis comprising spaced parallel beams 10, connected at their forward ends by means of a rectangular yoke 11. The frame A is supported in elevated position by means of a pair of wheels W which are arranged side by side between the beams 10 and are journaled upon a common axle 13 which latter is mounted in the beams 10, as clearly shown in Fig. 2. To stabilize the apparatus, I provide a third wheel W' which is journaled on an axle 14 carried by a beam 15 secured to the adjacent beam 10, and which is held in rigid position by means of a brace bar 16. The beam 15 also serves as a support for an operator's seat 17, which latter is secured to a curved upright 18 carried by the beam 15.

The reference character B designates generally a cutting means for cutting the leaves of the sugar-cane plant. As here shown, the cutting means B comprises a blade holding plate 19, which is disposed below and between the wheels W. The plate 19 is of substantially rectangular formation and is disposed on an incline with relation to the vertical so as to present its lower edge at an acute angle to the soil. The plate 19 carries a cutting blade 20, which is suitably secured to the plate 19, so that its cutting edge projects beyond the lower side edge of the plate, as illustrated in Fig. 3. The plate 19 is yieldingly supported by a member 21 carried by the axle 13 through the medium of a pair of telescopic members 22 and 22ª. The tube 22 is pivotally connected to the plate 19, as indicated at 23, while the tube 22ª is pivotally connected to the member 21 at 23ª. The tube 22 slidably receives the tube 22ª and the latter is formed with a pin 24 which works in a slot 25 for limiting the sliding movement of the tubes, as will be understood. Surrounding both tubes 22 and 22ª is a coiled expansible spring 26, which urges the tubes longitudinally in opposite directions to cause the plate 19 to occupy a predetermined position.

In order to permit of vertical adjustment of the cutting means B and to elevate the same to avoid any obstruction or accumulation of straw, I provide mechanism which I will now describe. Referring particularly to Fig. 4, 27 designates a lever which is pivotally connected to the upper end of the plate 19 as indicated at 28, and which is formed intermediate its ends with an ear 29 which loosely surrounds the axle 13. The upper end of the lever 27 is formed with a series of spaced openings for pivotally receiving one end of a link 30, and the opposite end of the link 30 is pivotally connected to an arm 31 fixed to a shaft 32 journaled in bearings 33 at one end, and a segmental rack 34 at the other. The bearings 33 and the rack 34 are carried by the yoke 11, as clearly shown in Fig. 2. Fixed to the outer end of the shaft 32 is an operating lever 35, which latter is disposed at an angle with relation to the longitudinal axis of the apparatus and in such a position that it may be readily operated by a person occupying the seat 17. Mounted upon the lever 35 is a spring-pressed pawl 36 which is adapted to engage the teeth of the rack 34 for locking the lever 35 in any desired adjusted position. This pawl 36 is actuated in the usual manner by means of a bell-crank lever 37 and a connecting rod 38.

From the foregoing construction, it will be obvious that when the operating lever 35 occupies the position shown in solid lines in Fig. 4, the cutting means B will be lowered and, when the operating lever occupies the position shown in dash lines, the cutting means B occupies the position shown in dash lines. However, it is to be understood that the cutting means may occupy any intermediate position between the two extreme positions thereof as shown in Fig. 4, and in which intermediate positions it is secured by means of the rack and pawl, as has been previously described.

Referring again to Fig. 2, 40 designates a pair of convergent arms which have their forward ends pivotally secured at 40ᵃ to the parallel beams 10 of the frame A. The rear ends of the arms 40 terminate in angular portions which coöperate to form a yoke 41 in which is secured, by means of bolts 42, a block 43. The block 43 is for the purpose of supporting a plow P, and as here shown the plow is rigidly connected to the block 43 by means of a standard 44 and a brace bar 45.

Referring to Fig. 5, 46 designate uprights and 47 a bell-crank lever, the rear end of which latter has a sliding connection with the uprights by means of a slot 48 formed in the lever 47 and a pin 49 carried by the uprights and working in the slot. The uprights 46 are each formed with a vertical series of spaced openings 50 to permit of vertical adjustment of the pin 49, as will be understood. The forward end of the lever 47 is pivoted at 51 to a link 52, and the latter is pivoted at 53 between the forked end of the member 21. Pivoted to the lever 47 at 54 is the rear end of a bar 55, the forward end of such bar being forked as at 55ᵃ, as clearly shown in Fig. 2. Each of the arms of the forked end 55ᵃ are pivoted at 56 to plates 57, slidably mounted on the member 21 by means of a pin and slot connection 58. Each plate 57 is formed with superposed lateral extensions 59 which slidably receive rods 60, carried by plates 61. As shown in Fig. 2, the rear end of the member 21 is bifurcated. The arms of the bifurcated portion of the member 21 are formed with openings 62 to slidably receive portions 61ᵃ (Fig. 3) of the plates 61, which portions are secured to the opposite sides of a bar 63 disposed between the bifurcated portion of the member 21. The bar 63 has its rear end formed with a T head 63ᵃ which contacts with the link 52 as shown in Fig. 3. Surrounding the rods 60 and interposed between the extension 59 and the plate 61 are coiled expansible springs 64 which urge the plates 57 and 61 in opposite directions to maintain a constant tension between the bar 63 and the plates 57.

From the foregoing construction, it will be seen that the springs 64, through the intermediate connections, serve to maintain the bar 55 and the link 52 in predetermined positions, thus supporting the arms 40 in a horizontal position and causing the plow to assume the position shown in Fig. 3. This resilient supporting means also allows the plow to yield vertically to any obstructions with which it might contact during working of the apparatus, thus preventing the plow from being mutilated.

In order to elevate the plow when the same is not in use, or when it is desired to avoid some obstruction in its path, I provide an operating lever 65 which is disposed adjacent to the seat 17 so that the same may be readily actuated by the operator. The lower end of the lever 65 is provided with a bent portion 66 which is pivoted at 67 to the long arm of the bell crank lever 47. Pivoted at 68 is one end of a link 69, the opposite end of the latter being pivoted at 70 to the lower end of the link 52.

Referring now to Fig. 5, it will be seen that when the lever 65 occupies the position shown in solid lines, the plow P occupies a substantially horizontal position, and a working position with relation to the soil. When the lever 65 is moved to the position shown in dash lines, the bell-crank lever 47 is swung upwardly about the pivot 54 as a center, thus swinging the arms 40 upwardly about their pivot 40ᵃ and thereby elevating the plow P. The pivot point 54, however, is not stationary but is moved forwardly to the position indicated in dash lines, thus causing the bar 55 to also move forwardly and carrying therewith the plate 57. It will be obvious that the plow remains in this elevated position so long as the lever 65 occupies the position shown in dash lines.

From the foregoing description, taken in conjunction with the accompanying drawings, the operation of the apparatus will be apparent as follows:

A traction engine is adapted to be secured to members 71 formed on the rectangular yoke 11 so that the line of draft of the apparatus is to the left, as viewed in Fig. 1. With the apparatus in the inoperative position, the cutting means B and the plow P occupy the positions shown in Figs. 4 and 5, respectively. As the apparatus travels over the ground, the cutting means B and plow P are lowered to the operative positions, whereby the blade 20 penetrates the soil and thus engages and cuts the straw leaves of the sugar-cane plants. It will be noted that, because of the angular position of the blade 20, a shearing action is obtained so as to effectively cut the leaves. Simultaneously therewith, the plow P in the rear of the cutting means B, plows the soil directly in the rear of the cutting means so that the cut leaves are embedded beneath the surface of the soil. With the leaves embedded in the earth, they are caused to decay and to thus form fertilizer for enriching the soil.

If the cutting means B should engage an impassable object, such as a rock, or an excessive accumulation of leaves, the cutting means is free to move upwardly so as to pass over such obstruction by virtue of the resilient supporting means. If the obstruction is of such a size that the normal upward movement of the cutting means is insufficient to pass over the object, the operator actuates the lever 35, thereby elevating the same sufficiently to pass the obstacle. If it is desired to vary the depth at which the cutting means penetrates the soil, it is obvious that by actuation of the lever 35, the cutting means may be adjusted within the range of the segmental rack 34.

As has been previously explained, the plow P can be likewise elevated to pass any obstruction which it might engage, and, because of the disposition of the levers 35 and 65, an operator when occupying the seat 17 can manipulate either of such levers and thus control the cutting means and the plow.

Although I have herein shown and described only one form of apparatus embodying my invention, it is to be understood that various changes and modifications may be made within the scope of this invention without departing from the spirit and scope of the appended claims.

What I claim is:

1. An apparatus of the character described, comprising a pair of wheels, a frame carried by said wheels, a cutting blade pivotally secured to said frame between said wheels and adapted to penetrate the soil, means for adjusting said blade vertically, and means for yieldingly retaining said blade in a predetermined position and including a telescopic arm pivotally secured to said frame and to the blade, and means carried by said arm and adapted to retain the same in extended position.

2. An apparatus of the character described, comprising a pair of wheels, a frame carried by said wheels, a cutting blade pivotally secured to said frame between said wheels and adapted to penetrate the soil, means for adjusting said blade vertically, means for yieldingly retaining said blade in a predetermined position and including a telescopic arm pivotally secured to said frame and to the blade, and a coiled spring surrounding said arm and adapted to retain the same in extended position.

3. In combination, a wheeled frame, a plate, means for resiliently supporting said plate on the frame, comprising an extensible link and a coiled extensible spring surrounding said link, a lever fulcrumed on said frame and pivotally connected to said plate, a pawl and ratchet mechanism on the frame, an adjustable connection between said mechanism and lever.

4. An apparatus of the character described, comprising a pair of wheels, a frame carried by said wheels, a cutting blade pivotally secured to said frame between said wheels and adapted to penetrate the soil, means for adjusting said blade vertically, means for yieldingly retaining said blade in a predetermined position and including a telescopic arm pivotally secured to said frame and to the blade, means carried by said arm and adapted to retain the same in extended position, and covering means carried by said frame in the rear of said blade.

5. An apparatus of the character described, comprising a pair of wheels, a frame carried by said wheels, a cutting blade pivotally secured to said frame between said wheels and adapted to penetrate the soil, means for adjusting said blade vertically, means for yieldingly retaining said blade in a predetermined position and including a telescopic arm pivotally secured to said frame and to the blade, means carried by said arm and adapted to retain the same in extended position, and a plow carried by said frame in the rear of said blade.

In testimony whereof I have signed my name to this specification.

JOSE B. RAMOS.

Copies of this patent may be obtained for five cents each, by addressing the "Commissioner of Patents, Washington, D. C."